United States Patent

Luo

Patent Number: 5,870,103
Date of Patent: Feb. 9, 1999

[54] METHOD FOR CREATING REALISTIC-LOOKING COMPOSITE IMAGES

[75] Inventor: Jiebo Luo, Rochester, N.Y.

[73] Assignee: Eastman Kodak Company, Rochester, N.Y.

[21] Appl. No.: 768,189

[22] Filed: Dec. 17, 1996

Related U.S. Application Data

[63] Continuation-in-part of Ser. No. 720,158, Sep. 25, 1996, abandoned.

[51] Int. Cl.⁶ .................................................. G06T 15/50

[52] U.S. Cl. .......................................... 345/435; 345/431

[58] Field of Search ..................... 345/431–35, 113–114; 382/163–165

[56] References Cited

U.S. PATENT DOCUMENTS

| 4,457,599 | 7/1984 | Sawicki | 352/89 |
| 5,022,085 | 6/1991 | Cok | 382/1 |
| 5,557,339 | 9/1996 | Dadourian | 348/586 |
| 5,668,897 | 9/1997 | Stolfo | 382/135 |

Primary Examiner—Rudolph J. Buchel, Jr.
Attorney, Agent, or Firm—Peyton C. Watkins

[57] ABSTRACT

A computer program product comprises a computer-readable storage medium including a program for extracting boundary characteristics of a foreground object from a foreground image; determining a feathering function based on the extracted boundary characteristics of the foreground object; compositing the foreground object with a background image; and resynthesizing the boundary characteristics of the foreground object with the background image.

9 Claims, 2 Drawing Sheets

NF: number of foreground pixels within the window
NB: number of background pixels within the window

METHOD FOR CREATING REALISTIC-LOOKING COMPOSITE IMAGES

This is a Continuation in part of application Ser. No. 08/720,158 filed 25 Sep., 1996 now abandoned.

FIELD OF THE INVENTION

The invention relates generally to the field of image manipulation and editing systems and is particularly directed to a mechanism for creating composite images. More specifically, the invention relates to a technique for blending the boundaries between the foreground and background in order to create realistic-looking composite photographic images.

BACKGROUND OF THE INVENTION

In computer-based image manipulation and editing systems, it is a common practice to extract people or objects, termed the "foreground", from a scene, and insert or composite them into or on top of a second image termed the "background" image. In general, these two images are from different sources. Without special treatment, undesirable boundary artifact may result along the boundaries between the "foreground" and the "background" in the composite image. In other words, the "foreground" does not blend smoothly with the new "background". The artifact is particularly pronounced where the boundary has an arbitrary shape, and where there are arbitrarily different color patches or textured patches across the boundary, due to the quantization of the image data in terms of limited number of code values, as well as the sampling in terms of limited spatial resolution. This problem is also referred to as "aliasing". One possible solution to the problem of boundary artifact reduction is called "feathering", i.e. locally blurring the boundary between the "foreground" and the "background."

However, another obvious problem may arise for many feathering techniques. It is noticed that the boundary of the foreground people/objects may not have the same focus characteristics, in particular for close-up shots. Moreover, some segments of the foreground boundary may not have the same sharpness as other segments that are in equally good focus due to the physical reflectance properties of the material. For example, the border of hair, mustache, wool, beard, or feather generally appear "fuzzy." In fact, "feathering" is an operation named after the process to create a feather looking effect. Also, some segments of the boundary may appear blurred due to motion. Typically, operators use a "compromising" feathering factor due to the fact that the boundary between the foreground and background includes different characteristics that vary along the boundary. Even though such a compromising blurring factor is applied, frequently, this does not adequately compensate for the boundary differences because it uses a constant feathering factor.

U.S. Pat. No. 5,022,085 describes a technique for neighborhood-based merging of image data. The technique employs a "feathering" window containing a number of neighboring pixel locations over which the pixel values of the foreground are controllably modified to achieve a tapered blending of the foreground and the background. Whether the data value for a pixel within the editing canvas is to be modified depends on whether or not the pixel location is both within the foreground and a prescribed distance to the boundary of the foreground. In summary, the feathering coefficient as disclosed in U.S. Pat. No. 5,022,085 is determined by the ratio of the number of foreground pixels and the number of background pixels within the feathering window. Therefore, the extent to which feathering takes place depends on how close the pixel is to the border of the foreground image. This technique performs a gradual blending of the foreground image along its border with the background image. However, the composited image may still look less than realistic if one notices that the boundary of the foreground has almost the same focus characteristics everywhere along the boundary because the boundary pixels are all blended in the same way. In other words, the feathering function has the same shape everywhere along the foreground boundary.

SUMMARY OF THE INVENTION

The present invention is directed to overcoming one or more of the problems set forth above. Briefly summarized, according to one aspect of the present invention, the invention resides in a computer program product, comprising: a computer-readable storage medium including program means comprising: (a) means for extracting boundary characteristics of a foreground object from a foreground image; (b) means for determining a feathering function based on the extracted boundary characteristics of the foreground object; (c) means for compositing the foreground object with a background image; and (d) means for resynthesizing the boundary characteristics of the foreground object with the background image.

It is an object of the present invention to provide a method for feathering which compensates for variations in the boundary characteristics.

It is an advantage of the present invention to provide a cost-effective method for feathering which compensates for variations in the boundary characteristics.

The above and other objects of the present invention will become more apparent when taken in conjunction with the following description and drawings wherein identical reference numerals have been used, where possible, to designate identical elements that are common to the figures.

DETAILED DESCRIPTION OF THE INVENTION

Figure 1:
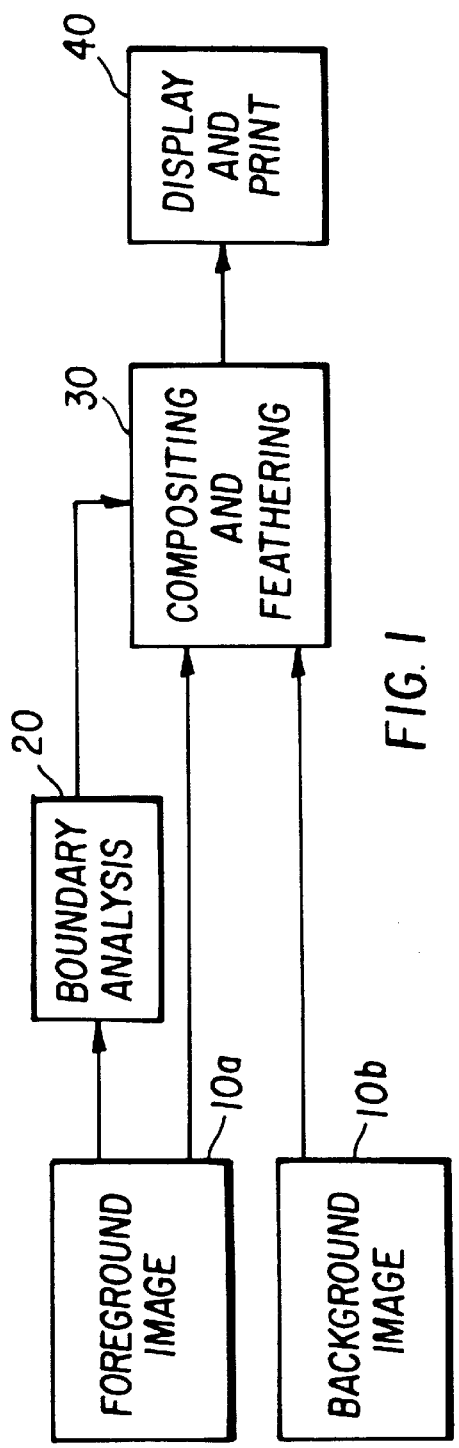
FIG. 1 diagrammatically shows a digital image editing system for compositing images with intelligent feathering capability.

It is instructive to note that the preferred embodiment is illustrated as implemented through programming a digital computer, although it may also be performed by means of signal processing circuits such as special integrated circuit hardware, or even specialized analog circuits. The structure and control of the invention is illustrated in the drawings. Given the system and mechanism description as described in the following, implementation is within the ordinary skill in such arts.

Still further, as used herein, a computer readable storage medium may comprise, for example; magnetic storage media such as magnetic disc (such as a floppy disc) or magnetic tape; optical storage media such as optical disc, optical tape, or machine readable bar code; solid state electronic storage devices such as random access memory (ROM), or read only memory (RAM); or any other physical device or medium employed to store a computer program.

Referring to FIG. 1, there is illustrated a flow diagram of a digital image processing system for intelligent feathering. Two digital images 10 (background 10b and foreground 10a images) are input into the digital computer (not shown) for subsequent retrieval by the software program of the present invention. The user designates foreground objects of interest by, for example, tracing the foreground object illustrated on a monitor by a mouse, or other means known in the art; a boundary analysis 20 process is performed on the designated boundary as will be described in detail below. The result of this process, i.e. the information about the characteristics of the foreground boundary, is used as the control signal for the digital compositing and feathering process 30. Finally the resulting composite image is either displayed on a monitor or sent to a printer 40 for printing.

Two major measures—focus and sharpness—are used in the preferred embodiment to represent the characteristics of the boundary, although those skilled in the art will recognize that other measures may also apply. In general, the sharpness of the boundary relates to both the magnitude and the extent of gradient across the boundary, and the focus relates to the extent of gradient across the boundary. The detection of the foreground boundary, or equivalently, the extraction of the foreground people/objects from the original scene can be accomplished by methods known in the art and, therefore, will not be addressed in connection with the present invention.

Figure 2:
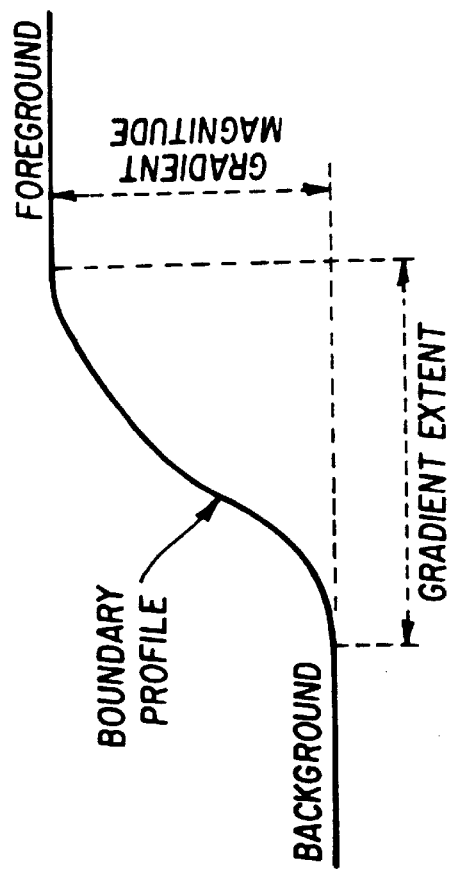
FIG. 2 illustrates a foreground-background boundary profile and the associated properties.

Once the foreground boundary is determined, both the extent and the magnitude of the gradient across the boundary at each pixel, as shown in FIG. 2, can be computed using edge operators. For example, one can use Sobel edge operators to compute the horizontal and vertical components of the gradient vector, and then determine the corresponding horizontal and vertical extent of the transition.

The designated foreground objects of interest are then merged with the background image for forming a composite image. During the composition process, a feathering process is applied to the transition areas between the foreground object and background image in the composite image by the below-described process.

Figure 3:
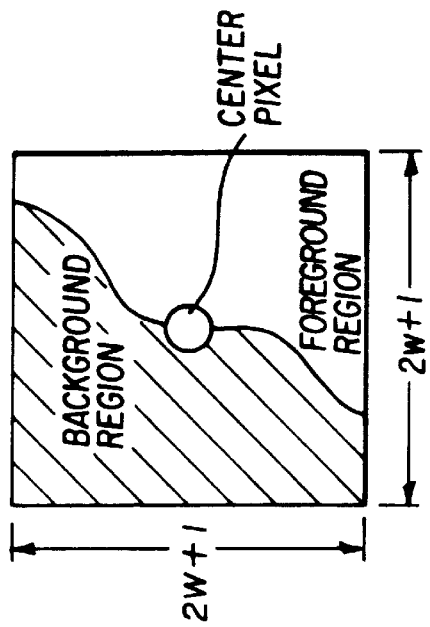
FIG. 3 shows a feathering window.

Referring to FIG. 3, a feathering window of size (2w+1× 2w+1) is illustrated for utilization in the compositing process; where (2w+1) is the window size measured in pixels. The window is centered at the current pixel of interest along the boundary, and is moved to each pixel along the boundary for repeating the below-described process. Depending on whether foreground or background pixels are present within the window or not, a pixel location can be classified as in one of the following regions: (1) pure background region, (2) pure foreground region, or (3) transition region (or foreground boundary region).

Pure background regions and pure foreground regions, which are regions where the local window would see either background or foreground pixels, are not directly affected by the feathering. However, remanipulation of the pure regions can be performed to achieve desired effects. For example, one may want to lighten the foreground people/objects. Should any remanipulation need to be done in both or either of the foreground and background regions, the boundary feathering is preferred to be done upon the completion of such remanipulation. In trivial cases where no such remanipulation occurs, the pure regions are directly replicated from the individual source images.

One can resynthesize the focus and sharpness characteristics of the foreground boundary with a new background at a boundary (or transition) pixel location where the feathering window sees mixture of foreground and background pixels. Since image is two-dimensional, depending on whether isotropic operations are desired, there are two ways to utilize the boundary gradient information obtained from the original scene. The first way is to use separable feathering functions in horizontal and vertical directions. At a pixel location where feathering is to take place, the horizontal feathering function and the vertical feathering function are determined by the gradient magnitude and extent in the horizontal and vertical direction, respectively. The feathering can also be performed in an isotropic fashion. To this end, a combined gradient magnitude such as $g=\sqrt{g^2_x+g^2_y}$, or, $g=(|g_x|+|g_y|^{.51})/2$ can be computed, and the average of the transition extent in horizontal and vertical direction can be computed; where $g_x$ is the horizontal component of gradient vector from the edge operator and $g_y$ is the vertical component of gradient vector from the edge operator. In the second case, the resulting single scalar value of the magnitude and extent can then be used to determine a generally nonseparable blurring function. Moreover, the extent of the transition can be used to determine the size of the feathering window, which can be non-squared if separable blurring is applied. Because of the constraint that the sum of the feathering kernel coefficients is normalized to unity, the size of the window also affects the gain and shape of the feathering function kernel.

One way of utilizing the gradient information across the boundary is to continuously modulate the shape of a generic feathering function by the estimated gradient information. For example, if a generic Gaussian function is adopted, the gain of the Gaussian function can be adjusted such that the gain is greater as the gradient magnitude increases, provided that the feathering function is always normalized to a sum of unity as shown in the following examples. Consequently, the feathering function gets closer to an impulse function, which implies a boolean compositing where no feathering takes place and the transition between the foreground and the background approaches ideal step transition. An ideal step transition can only result if the imaging system has no high frequency falloff in its MTF (modulation transfer function). This is why boolean composite images look unnatural and objectionable for images assumed to be obtained by practical imaging means. On the other hand, one can achieve a whole spectrum of blending by adjusting the relationship between the feathering function and the original boundary properties.

Figure 4:
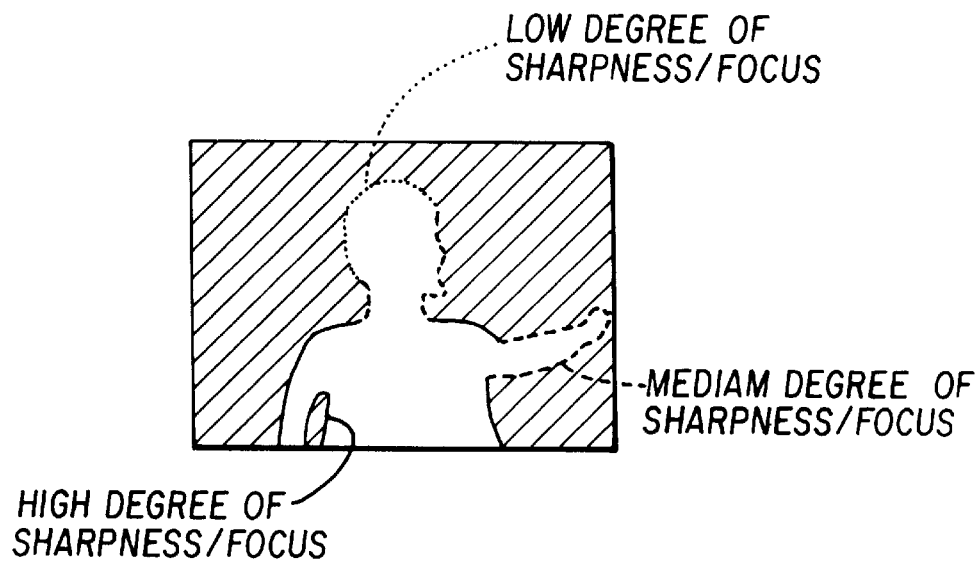
FIG. 4 graphically illustrates the classification of foreground boundary into segments of different characteristics.

A more practical way is to select from an array of feathering functions that provide different degrees of blurring. For example, one can segment the foreground boundary into high contrast, medium contrast, and low contrast segments, as illustrated in FIG. 4. Then, a proper feathering function is selected from a collection of functions with different degrees of feathering for the feathering of a particular boundary segment based on the sharpness/focus of the segment. The following are examples of different isotropic, fixed-width feathering functions for creating different sharpness/focus boundary characteristics, in a descending order of blurring capability, or an ascending order of the resulting boundary contrast, a crude term for sharpness and focus. In general, a boundary segment in focus will appear to be of high contrast.

| | | | |
|---|---|---|---|
| High | .075100 | .123900 | .075100 |
| | .123900 | .204200 | .123900 |
| | .075100 | .123900 | .075100 |
| Medium | .041685 | .129513 | .041685 |
| | .129513 | .316160 | .129513 |
| | .041685 | .129513 | .041685 |
| Low | .007516 | .095347 | .007516 |
| | .095347 | .590000 | .095347 |
| | .007516 | .095347 | .007516 |

Figure 5:
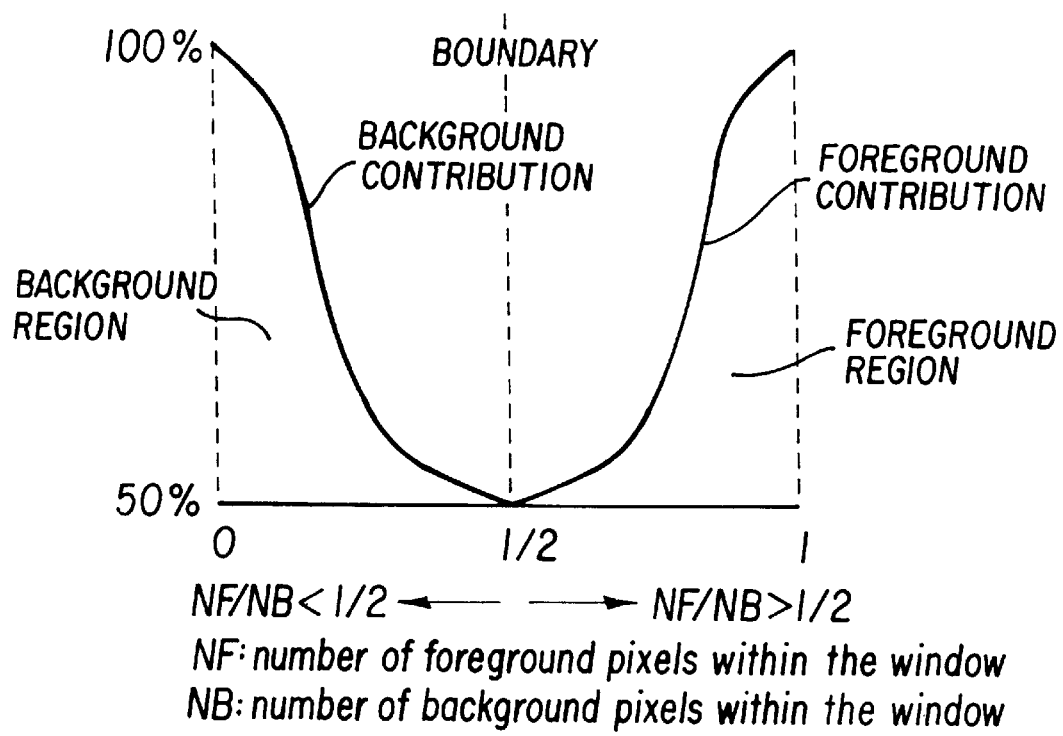
FIG. 5 graphically illustrates the relationship between the feathering function and the number of foreground, background pixels within the feathering window.

A feathering function of a tapering shape similar to what's illustrated in FIG. 5 is advantageous over a linear feathering function. It enables the reproduction of smooth and natural transition, and is less prone to excessive blurring than a linear function. In essence, it generally better approximates the MTF characteristics of the practical imaging systems. Within the transition zone between the foreground and the background, the amount of feathering or blurring is gradually reduced, following the shape of the feathering function, as one gets further away from the boundary. The non-linear relationship between the feathering function and the foreground, background pixel numbers within the feathering window is graphically illustrated in FIG. 5. When the center pixel is within the foreground region and gets further away from the boundary, the contribution from the foreground pixels increases, following the shape of the feathering function, from 50% to 100%. On the other hand, the contribution from the background pixels increases in the same fashion when the center pixel is within the background and gets further away from the boundary.

The size of the feathering window, (2w+1), can be determined in one of the following ways. Since the extent of the gradient transition indicates the focus of the boundary, one way to choose the size of the feathering window is to reflect the gradient extent; for example, making (2w+1) equal to or proportional to the estimated gradient extent. However, the computational complexity can be increased in this way. On the other hand, one can choose a fixed "w", for example, (2w+1)=3, as in the three feathering functions shown above. In this case, however, the gradient extent will affect the feathering indirectly through contributing to the determination of the gain of the feathering function. In general, an out-of-focus effect, usually created by using a larger feathering window, can be approximated by selecting a lower gain for the feathering function, or vice versa. Moreover, the implementation of the feathering is simplified by using a fixed-size feathering window.

The invention has been described with reference to a preferred embodiment. However, it will be appreciated that variations and modifications can be effected by a person of ordinary skill in the art without departing from the scope of the invention.

Part List:
10*a* background digital image
10*b* foreground digital image
20 boundary analysis
30 compositing and feathering process
40 display or printer

I claim:
1. A computer program product, comprising:
 a computer-readable storage medium including program means comprising:
  (a) means for extracting boundary characteristics of a foreground object from an original image based on analyzing a gradient of a foreground boundary profile;
  (b) means for determining a non-linearly shaped feathering function based on the extracted boundary characteristics of the foreground object;
  (c) means for compositing the foreground object with a background image; and
  (d) means for resynthesizing the boundary characteristics of the foreground object with the background image based on the feathering function.
2. The computer program product as in claim 1, wherein said extracting means includes characterizing the boundary profile by the magnitude and extent of the gradient across the boundary.
3. The computer program product as in claim 2, wherein said determining means includes segmenting the foreground boundary according to the magnitude and extent of the gradient across the boundary.
4. The computer program product as in claim 2, wherein said determining means includes determining the feathering function based on continuous modulation by direct estimates of the magnitude and extent of the gradient across the boundary.
5. The computer program product as in claim 1, wherein said determining means includes accomplishing the feathering using a local feathering window.
6. The computer program product as in claim 5, wherein said determining means includes performing the feathering at a pixel location in substantially close proximity to the foreground boundary, where the feathering window includes both foreground and background pixels.
7. The computer program product as in claim 5, wherein said determining means includes determining the feathering function based on the segmentation of the foreground boundary.
8. The computer program product as in claim 5, wherein said determining means includes nonlinearly tapering the shape of the feathering function from its center.
9. The computer program product as in claim 1 further comprising means for remanipulating pure foreground regions and pure background regions, and the feathering is performed using the foreground or background after remanipulation.

* * * * *